United States Patent
Ikarashi et al.

(10) Patent No.: US 9,064,123 B2
(45) Date of Patent: Jun. 23, 2015

(54) SECURE PRODUCT-SUM COMBINATION SYSTEM, COMPUTING APPARATUS, SECURE PRODUCT-SUM COMBINATION METHOD AND PROGRAM THEREFOR

(75) Inventors: Dai Ikarashi, Tokyo (JP); Koki Hamada, Tokyo (JP); Koji Chida, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/003,637

(22) PCT Filed: Mar. 8, 2012

(86) PCT No.: PCT/JP2012/055974
§ 371 (c)(1),
(2), (4) Date: Sep. 6, 2013

(87) PCT Pub. No.: WO2012/121333
PCT Pub. Date: Sep. 13, 2012

(65) Prior Publication Data
US 2013/0339728 A1    Dec. 19, 2013

(30) Foreign Application Priority Data

Mar. 10, 2011 (JP) ................................ 2011-053284
Jun. 28, 2011 (JP) ................................ 2011-142715

(51) Int. Cl.
*H04L 29/06* (2006.01)
*G06F 21/60* (2013.01)
*H04L 9/08* (2006.01)
*H04L 9/00* (2006.01)

(52) U.S. Cl.
CPC .............. *G06F 21/602* (2013.01); *H04L 9/085* (2013.01); *H04L 2209/42* (2013.01); *H04L 9/00* (2013.01); *H04L 2209/46* (2013.01)

(58) Field of Classification Search
CPC ..... H04L 9/0656; H04L 9/0662; H04L 9/085; H04L 9/0869
USPC ........................ 713/194, 189; 726/26; 380/28
See application file for complete search history.

(56) References Cited

U.S. PATENT DOCUMENTS

2008/0137857 A1* 6/2008 Bellare et al. ................. 380/255

OTHER PUBLICATIONS

Chida, K., et al., "A Three-Party Secure Function Evaluation with Lightweight Verifiability Revisited", CSS2010, pp. 1-5, (2010) (with English abstract).
secureSCM-Consortium, "D9.2 Security Analysis", Crypto Graphic Aspects, pp. 1-88, (Jul. 2009).
International Search Report Issued Apr. 3, 2012 in PCT/JP12/055974 Filed Mar. 8, 2012.

* cited by examiner

*Primary Examiner* — Edward Zee
(74) *Attorney, Agent, or Firm* — Oblon, McClelland, Maier & Neustadt, L.L.P.

(57) ABSTRACT

The efficiency of multiplication in secure function computation is increased to make the secret function computation faster than before. Three or more computing apparatuses cooperate to generate a secret value of a random number, perform secure function computation for secret values of arbitrary values by using a function including addition and multiplication to compute concealed function values, and compute a secret value. If the secret value is [0], a concealed function value is output; otherwise, information indicating that tampering has been detected is output.

14 Claims, 6 Drawing Sheets

SECURE PRODUCT-SUM COMBINATION SYSTEM, COMPUTING APPARATUS, SECURE PRODUCT-SUM COMBINATION METHOD AND PROGRAM THEREFOR

TECHNICAL FIELD

The present invention relates to a secure product-sum combination system, a computing apparatus, a secure product-sum combination method, and a program therefor that compute an formula including multiplication and addition while concealing data by secret sharing and keeping the validity of the result of the computation.

BACKGROUND ART

Non-patent literature 1 describes a three-party secure function computation which is a technique for performing a computation including multiplication and addition while concealing data and ensuring validity of the result of the computation. This is a protocol that derives the result of an arithmetic/logical operation by cooperative computations by three parties (three computing entities) without reconstructing distributed input values. In the three-party secure function computation protocol, a secure product-sum combination system treats data as natural numbers less than a predetermined prime p. To conceal data, the data, a, is divided into three and distributed so that the following condition is satisfied.

$$a = a_0 + a_1 + a_2 \bmod p$$

In practice, the secure product-sum combination system generates random numbers $a_1$ and $a_2$ so that $a_0 = a - a_1 - a_2$. Then, $(a_0, a_1)$, $(a_1, a_2)$ and $(a_2, a_0)$ are sent to three parties, X, Y and Z, respectively. Since $a_1$ and $a_2$ are random numbers, none of the parties X, Y and Z has information about a, but if any two of the parties cooperate, a can be reconstructed.

The concealment is commutative because the concealment is additive sharing. Accordingly, adding the shared values together and then reconstructing the values yields the same result as reconstructing the values and then adding the values together. That is, addition and multiplication by a constant can be performed in a distributed manner without communication. Multiplication is also possible, although communication and generation of random numbers are required. Accordingly, a logic circuit can be configured so that any computations can be performed. An example of the three-party secure function computation will be described below. While a computation result in the three-party secure function computation protocol is the remainder of division by p, "mod p" will be omitted in the following description for the sake of simplicity.

(1) Reconstruction of Secret Data a Distributed Among X, Y and Z

X sends $a_0$ to Y and $a_1$ to Z. Y sends $a_i$ to Z and $a_2$ to X. Z sends $a_2$ to X and $a_0$ to Y.

X computes $a_0 + a_1 + a_2$ to reconstruct a if $a_2$ received from Y and $a_2$ received from Z are equal. Y computes $a_0 + a_1 + a_2$ to reconstruct a if $a_0$ received from X and $a_0$ received from Z are equal. Z computes $a_0 + a_i + a_2$ to reconstruct a if $a_1$ received from X and $a_i$ received from Y are equal.

(2) Secure Computation of C=a+b

Assume that data b is also concealed by distribution among X, Y and Z in the same way as data a, namely $(b_0, b_1)$, $(b_1, b_2)$ and $(b_2, b_0)$ are distributed to X, Y and Z, respectively.

Then, X computes and records $(c_0, c_1) = (a_0 + b_0, a_1 + b_1)$, Y computes and records $(c_1, c_2) = (a_1 + b_1, a_2 + b_2)$, and Z computes and records $(c_2, c_0) = (a_2 + b_2, a_0 b_0)$.

(3) Secure Computation of c=a+α (α is a Known Constant)

X computes and records $(c_0, c_1) = (a_0 + a, a_1)$ and Z computes and records $(c_2, c_0) = (a_2, a_0 + a)$. Y performs no operation.

(4) Secure Computation of c=a·α

X computes and records $(c_0, c_1) = (a_0 \cdot \alpha, a_1 \cdot \alpha)$, Y computes and records $(c_1, c_2) = (a_1 \cdot \alpha, a_2 \cdot \alpha)$, and Z computes and records $(c_2, c_0) = (a_2 \cdot \alpha, a_0 \cdot \alpha)$.

(5) Secure Computation of c=a·b (Multiplication without Tampering Detection)

First, X generates random numbers $r_1$, $r_2$ and $c_0$, computes $c_1 = (a_0 + a_1)(b_0 + b_1) - r_1 - r_2 - c_0$ and sends $(r_1, c_1)$ to Y and $(r_2, c_0)$ to Z.

Then, Y computes $y = a_1 \cdot b_2 + b_1 \cdot a_2 + r_1$ and sends y to Z. Z computes $z = a_2 \cdot b_0 + b_2 \cdot a_0 + r_2$ and sends z to Y.

Then, Y and Z independently compute $c_2 = y + z + a_2 \cdot b_2$.

X records $(c_0, c_1)$, Y records $(c_1, c_2)$ and Z records $(c_2, c_0)$.

(6) Secure Computation of c=a·b (Multiplication with Tampering Detection)

After the multiplication c=a·b according to the method in (5) described above, the following process is performed on each of X, Y and Z. Note that P in the process represents each of X, Y and Z; if P is X, $P_-$ represents Z and $P_+$ represents Y; if P is Y, $P_-$ represents X and $P_+$ represents Z, if P is Z, $P_-$ represents Y and $P_+$ represents X.

First, $P_-$ and $P_+$ alone generate and share a random number r and $P_-$ and $P_+$ distribute $r \cdot a_0$, $r \cdot a_1$ and $r \cdot a_2$ to the parties as secret values for r·a. Then, $c' = (r \cdot a) \cdot b$ is computed according to the method in (5) described above and determination is made as to whether r·c−c' is equal to 0 or not. If r·c−c' is not equal to 0, it is detected as tampering.

Secure function computation based on Shamir secret sharing in Non-patent literature 2 (hereinafter referred to as "Shamir's scheme") is secure function computation without multiplication with tampering detection.

PRIOR ART LITERATURE

Non-Patent Literature

Non-patent literature 1: Koji Chida, Koki Hamada, Dai Ikarashi, Katsumi Takahashi, "A Three-Party Secure Function Evaluation with Lightweight Verifiability Revisited", CSS2010, 2010.

Non-patent literature 2: Secure SCM-Consortium, "D9.2 Security Analysis", Cryptographic Aspects, 2009, pp. 19-26.

SUMMARY OF THE INVENTION

Problems to be Solved by the Invention

Although multiplication is possible in three-party secure function computation, the multiplication involves communication and generation of random numbers. Accordingly, multiplication has been a bottleneck in computations and prohibits speeding up of secure function computation. Shamir's scheme requires half the amount of data required by the method described in Non-patent literature 1. In Shamir's scheme, four or more computing apparatuses may be used. However, there is not a known tampering detection method for Shamir's scheme, except a method using public key cryptography, which requires a huge computation cost (for example about 1000 times larger than other schemes).

An object of the present invention is to provide a secure product-sum combination system, a computing apparatus, a secure product-sum combination method, and a program therefor that increase the efficiency of multiplications in secure function computation to enable faster secure function computation than before.

Means to Solve the Problems

A secure product-sum combination system of the present invention computes a concealed function value $[C]=[f([A_0], \ldots, [A_{n-1}])]$ by three or more computing apparatuses performing secure function computation on secret values $[A_0], \ldots, [A_{n-1}]$ concealed by encryption or secret sharing of n arbitrary values $A_0, \ldots, A_{n-1}$ greater than or equal to 0 and less than p (p is a prime) using a function f including addition and/or multiplication in cooperation with one another. Each of the computing apparatuses includes a random number generator, a function calculator, and a tampering detector. Here, [ ] is a symbol representing that the value in [ ] is concealed by encryption or secret sharing and is used for distinguishing a secret value from an unconcealed value. For example, if actual values are secret-shared, [ ] conceptually represents a set of secret shares of the actual value enclosed in [ ]. In the secure product-sum combination system of the present invention, $[\alpha a+\beta]=\alpha[a]+\beta,$ $[a+b]=[a]+[b]$ and $[a \cdot b]=[a] \cdot [b]$ hold, where a, b, $\alpha$ and $\beta$ are arbitrary values greater than or equal to 0 and less than p. If the present invention is applied on the basis of the technique described in Non-patent literature 1, the secure product-sum combination system can be configured with three computing apparatuses. If the present invention is applied on the basis of Shamir's scheme, the secure product-sum combination system can be configured with three or more computing apparatuses.

The random number generator generates a secret value [r] of a random number r greater than or equal to 1 and less than p in cooperation with the random number generators of the other two computing apparatuses.

The function calculator computes secure function values $[C]=[f([A_0], \ldots, [A_{n-1}])]$, $[C']=[r \cdot f([A_0], \ldots, [A_{n-1}])]$ using a function f including addition and/or multiplication for the secret values $[A_0], \ldots, [A_{n-1}]$ in cooperation with the function calculators of the other two computing apparatuses.

The tampering detector computes a secret value [r·C–C'] in corporation with the tampering detector of the other two computing apparatuses. If [r·C–C'] is equal to [0], then the tampering detector outputs [C]; otherwise, it outputs information indicating that tampering has been detected.

Effect of the Invention

The secure product-sum combination system, the computing apparatus, the secure product-sum combination method, and the program therefor of the present invention enable efficient multiplications in secure function computation to enable faster secure function computation than before.

DETAILED DESCRIPTION OF THE EMBODIMENTS

Arithmetic operations addressed by the present invention includes multiplication by a constant, addition of a constant, and addition and multiplication of secret values [a], [b] concealed by encryption or secret sharing of arbitrary values a, b greater than or equal to 0 and less than p (where p is a prime). Examples of the arithmetic operations include the following.

$[\alpha a+\beta]=\alpha[a]+\beta$ (multiplication by a constant and addition of a constant)

$[a+b]=[a]+[b]$ (addition)

$[a \cdot b]=[a] \cdot [b]$ (multiplication)

Here, $\alpha$ and $\beta$ are arbitrary values greater than or equal to 0 and less than p. While each result is the remainder of division by p, "mod p" is omitted for the sake of simplicity. For simplicity, "mod p" will be omitted herein and in the claims. The first formula represents that a secret value of $(\alpha a+\beta)$ can be obtained by multiplying a secret value [a] of a by a constant $\alpha$ and adding a constant $\beta$. The second formula represents that a secret value [a+b] of (a+b) can be obtained by adding a secret value [a] of a and a secret value [b] of b together. The third formula represents that a secret value of (a·b) can be obtained by multiplying a secret value [a] of a and the secret value [b] of b together. The assumption of the secure product-sum combination system of the present invention is that concealment, multiplication by a constant, addition of a constant, and addition and multiplication of secret values can be performed so that the three formulae given above hold. The secure function computation in Non-patent literature 1 includes addition, multiplication, constant addition, and constant multiplication. The formulae given above can therefore be computed by using the secure function computation in Non-patent literature 1. However, the present invention provides a method capable of faster computation.

According to the present invention, the result of secure computation performed on the result of multiplication of a random number r is compared with the result of secure computation multiplied by a random number. The presence of the random number r prevents tampering that causes the two computations to yield the same results. Therefore if the two computation results are not equal, it means that there is tampering. This is based on the fact that when addition and multiplication are performed in a domain where the modulus is a prime p, multiplication by a random number r yields a random number and therefore tampering such that a computation result multiplied by a random number r is equal to a computation result not multiplied by a random number is impossible.

Specifically, since the three formulae given above hold, the following relationship holds among arbitrary secret values [a], [b] greater than or equal to 0 and less than p and [a']=r·[a] and [b']=r·[b].

$r(\alpha[a]+\beta)=\alpha[a']+r\cdot\beta$ (multiplication by a constant and addition of a constant)

$r([a]+[b])=[a']+[b']$ (addition)

$r([a]\cdot[b])=[a']\cdot[b]$ (multiplication)

$r([a]\cdot[b])=[r\cdot a]\cdot[b]$ (multiplication)

That is, the value in parentheses (secret value [c]) on the left-hand side of each formula, which is the value to be computed, multiplied by r can be computed by the formula on the right-hand side (secret value [c']). If the secret value [c] to be computed has not been tampered with, [c'] can be computed such that $[r\cdot c]=[C]$, i.e., $[r\cdot c-c']=[0]$. On the other hand, if there is tampering, that is, the results of computations on the left- and right-hand sides are not [c] and [c'] but have been tampered with by adding tampering values u and v as [c+u] and [c'+v], u and v need to satisfy $[r\cdot u-v]=[0]$ so that $[r(c+u)-c'-v]=[r(c+u)-r\cdot c-v]=[0]$ hold. However, since r is a random number, the probability that the attacker can add u and v that satisfy $[r\cdot u-v]=[0]$ is as low as $1/(p-1)$ when r is a non-zero random number ($1 \leq r \leq p-1$) or as low as $1/p$ when r is a uniform random number ($0 \leq r \leq p-1$). Accordingly, tampering can be detected by computing [c] and [c'] and checking whether $[r\cdot c-c']$ is equal to [0] or not.

First Embodiment

Figure 1:
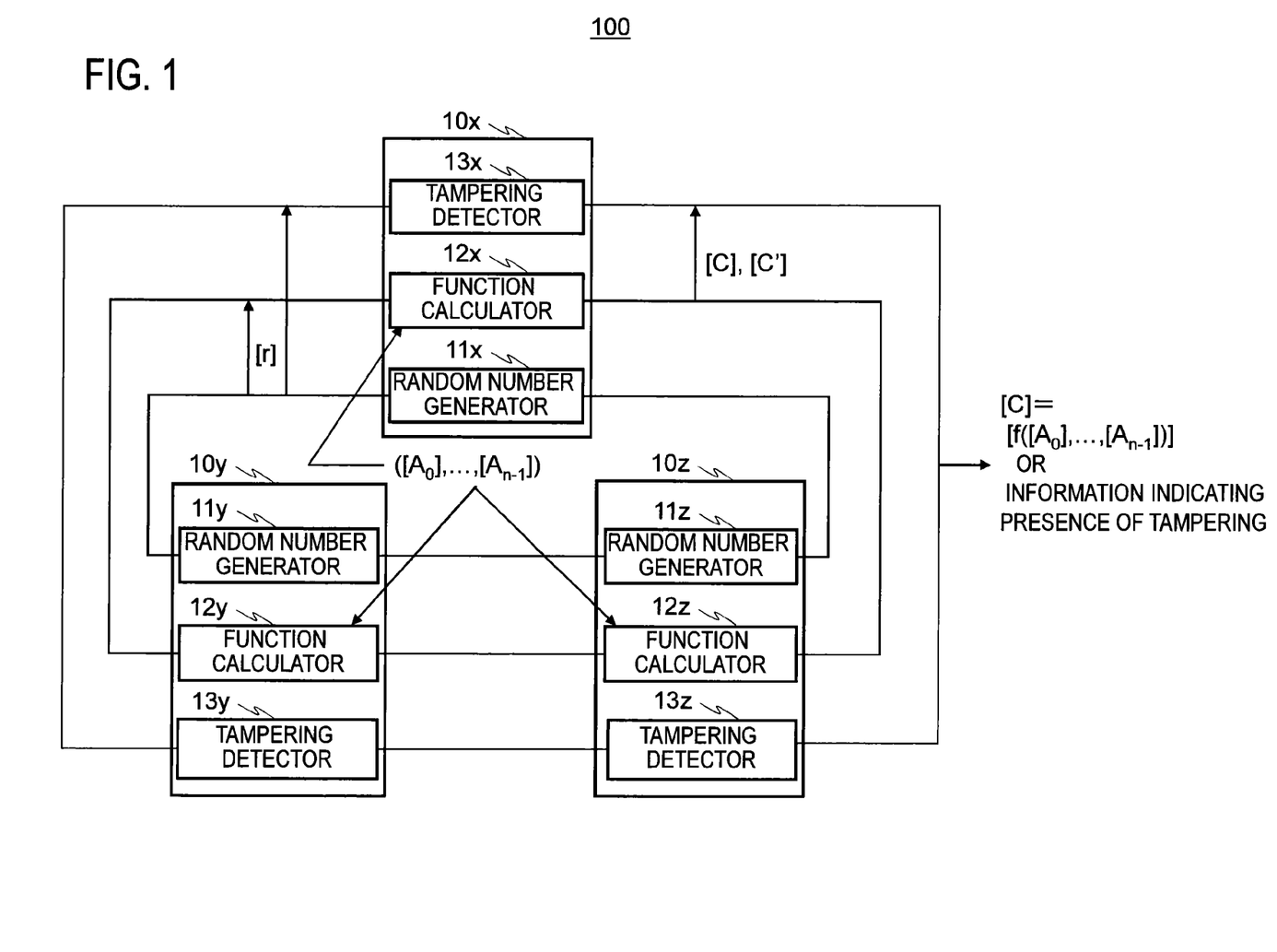
FIG. 1 is a diagram illustrating an exemplary configuration of a secure product-sum combination system 100.
Figure 2:
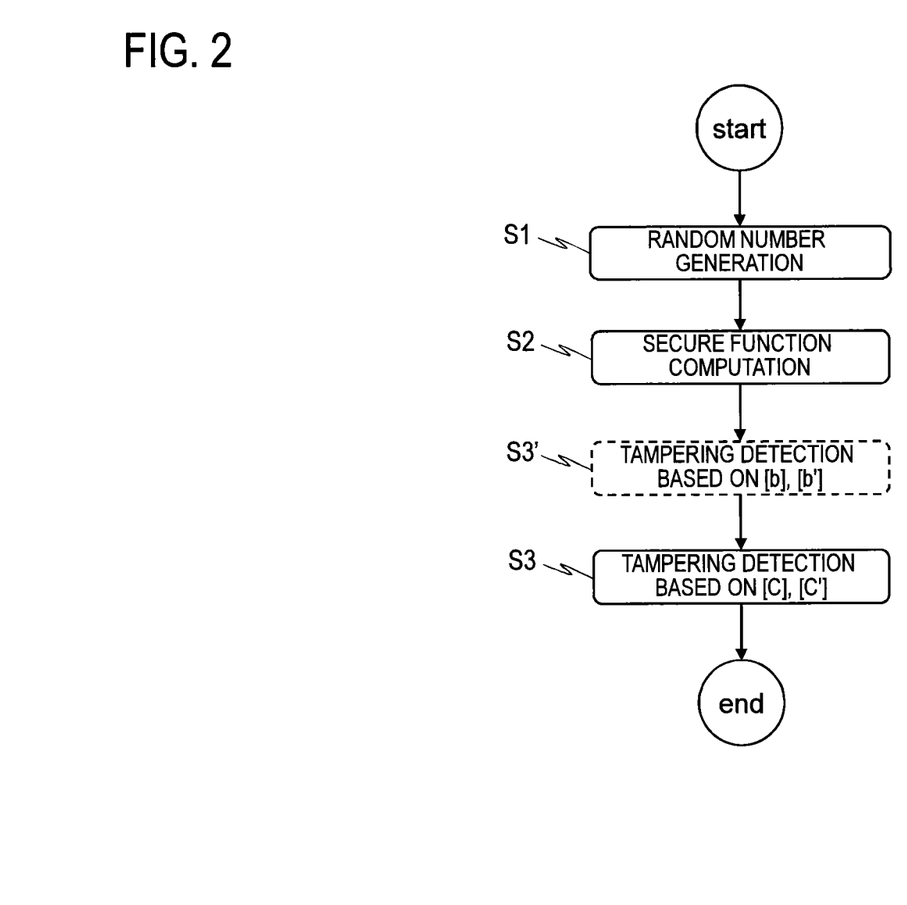
FIG. 2 is a diagram illustrating an exemplary process flow in a secure product-sum combination system 100.

FIG. 1 illustrates an exemplary configuration of a secure product-sum combination system 100 and FIG. 2 illustrates an exemplary process flow in the secure product-sum combination system 100. The secure product-sum combination system 100 includes three computing apparatuses 10x, 10y and 10z. The three computing apparatuses 10x, 10y and 10z of the secure product-sum combination system 100 perform secure function computation on secret values $[A_0], \ldots, [A_{n-1}]$ concealed by encryption or secret sharing of n arbitrary values $A_0, \ldots, A_{n-1}$ greater than or equal to 0 and less than p (p is a prime) by using a function f including addition and/or multiplication in cooperation with one another to compute a concealed function value $[C]=[f([A_0], \ldots, [A_{n-1}])]$.

The computing apparatus 10x includes a random number generator 11x, a function calculator 12x and a tampering detector 13x; computing apparatus 10y includes a random number generator 11y, a function calculator 12y, and a tampering detector 13y; computing apparatus 10z includes a random number generator 11z, a function calculator 12z and a tampering detector 13z.

Figure 3:
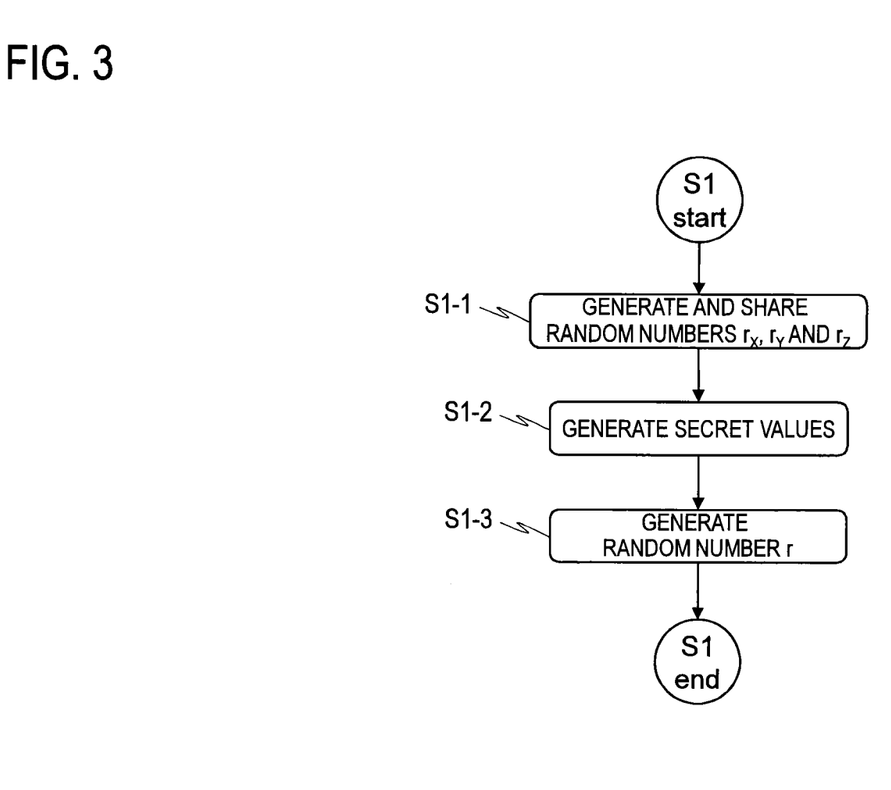
FIG. 3 is a diagram illustrating an exemplary process flow in a random-number generator 11x, 11y, 11z.
Figure 6:
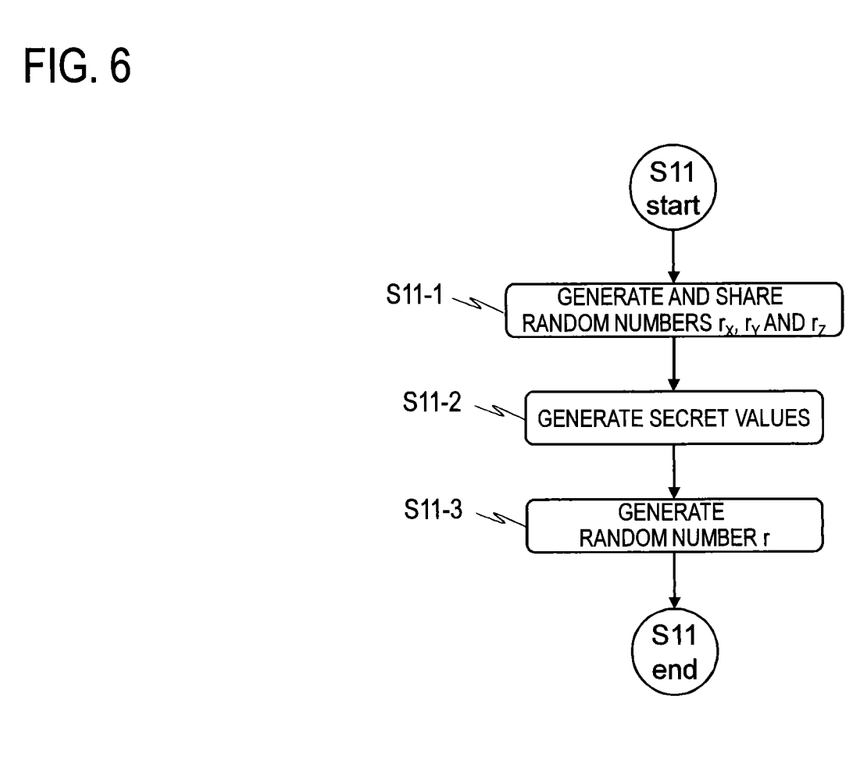
FIG. 6 is a diagram illustrating an exemplary process flow in a random number generator 21x, 21y, 21z.

The random number generators 11x, 11y and 11z generate a secret value [r], which is a non-zero random number r (a random number randomly chosen from among integers greater than or equal to 1 and less than p) in corporation with one another (S1). Specifically, the secret value [r] is generated as follows, for example (see FIG. 3). First, the random number generator 11x generates a non-zero random number $r_Z$ and shares the random number $r_Z$ with the random number generator 11y, the random number generator 11y generates a non-zero random number $r_X$ and shares the random number $r_X$ with the random number generator 11z, and the random number generator 11z generates a non-zero random number $r_Y$ and shares the random number $r_Y$ with the random number generator 11x (S1-1). Then, the concealment method disclosed in Non-patent literature 1 is used to generate secret values $[r_X]$, $[r_Y]$ and $[r_Z]$ of $r_X$, $r_Y$ and $r_Z$ (S1-2). Then multiplication with tampering detection in Non-patent literature 1 is used to multiply the secret values together to generate a secret value $[r]=[r_X \cdot r_Y \cdot r_Z]$ (S1-3). While the random numbers r, $r_X$, $r_Y$ and $r_Z$ in the example are non-zero random numbers, the random numbers may be uniform random numbers (random numbers randomly chosen from among integers greater than or equal to 0 and less than p). In the case of uniform random numbers, S11 in FIG. 6 is performed instead of S1. Specifically, the random number generators 11x, 11y and 11z generate uniform random numbers $r_X$, $r_Y$ and $r_Z$, respectively (S11-1), use the concealment method disclosed in Non-patent literature 1 to generate secret values $[r_X]$, $[r_Y]$ and $[r_Z]$ of $r_X$, $r_Y$ and $r_Z$ (S11-2) and add the secret values together to generate a secret value $[r]=[r_X+r_Y+r_Z]$ (S11-3).

The function calculators 12x, 12y and 12z cooperate to compute a concealed function values $[C]=[f([A_0], \ldots, [A_{n-1}])]$ and $[C']=[r\cdot f([A_0], \ldots, [A_{n-1}])]$ by using a function f including addition and/or multiplication on input secret values $[A_0], \ldots, [A_{n-1}]$ (S2). [C] and [C'] can be computed in parallel for higher efficiency of computation. To compute in parallel, the addition/multiplication of combinations of a constant, secret values, and secret pairs, which are pairs of secret values, need to be defined. Twelve arithmetic operations are defined. The function f is configured with a combination of any one or more of the 12 arithmetic operations. When computation of the function f and the defined 12 arithmetic operations are to be distinguished herein, the defined 12 arithmetic operations are referred to as fundamental operations. That is, the function f is one fundamental operation or a combination of multiple fundamental operations.

In the description, [a] and [b] represent secret values in each fundamental operation, [c] represents a secret value that is the result of each fundamental operation not multiplied by a random number r, and [c'] represents a secret value that is the result of each fundamental operation multiplied by a random number r. [a] and [b] are secret values concealed by encryption or secret sharing of arbitrary values a and b greater than or equal to 0 and less than p, and $[a']=r\cdot[a]$ and $[b']=r\cdot[b]$. Note that if the function f consists of multiple fundamental operations, [c] and [c'] are computed for each of the fundamental operations. For example, in the case of addition of $[A_0]$, $[A_1]$ and $[A_2]$, addition of $[A_0]$ and $[A_1]$ is performed as the first fundamental operation. In the first fundamental operation, $[A_0]$ is [a] and $[A_1]$ is [b]. As the results of the first fundamental operation, [c] and [c'] are obtained. In the second fundamental operation, the results of the first computation, [c] and [c'], are set as [a] and [a'] and $[A_2]$ is set as [b] to perform addition to obtain the results of the second fundamental operation, [c] and [c']. Since the function f in this example is a combination of two additions, the results [c] and [c'] of the second fundamental operation are function values [C] and [C'] of the function f.

Note additions and multiplications in the secure function computation in Non-patent literature 1 can be applied to five of the fundamental operations, namely, addition of secret values, addition of a constant to a secret value, multiplication of a secret value by a constant, addition of constants, and multiplication of constants. The other seven fundamental operations will be described here.

Multiplication of a Secret Pair ([a], [a']) by a Constant

If ([c], [c']) is a function value determined by a function that multiplies a secret pair ([a], [a']) by a constant, each of the secret pair ([a], [a']) is multiplied by an arbitrary constant α greater than or equal to 0 and less than p to obtain a secret pair ($\alpha\cdot[a]$, $\alpha\cdot[a']$) as ([c], [c']).

Addition of a Constant to a Secret Pair ([a], [a'])

If ([c], [c']) is a function value determined by a function that adds a constant to a secret pair ([a], [a']), a secret value [r] is multiplied by an arbitrary constant β greater than or equal to 0 and less than p to obtain a secret value $[r\cdot\beta]$, the constant β is added to the secret value [a], and the secret value [r·β] is added to the secret value [a'] to obtain a secret pair ([a]+β, [a']+[r·β]) as ([c], [c']).

Addition of Secret Pairs (([a], [a']) and ([b], [b']))

If ([c], [c']) is a function value determined by a function that adds secret pairs ([a], [a']) and ([b], [b']) together, the secret value [b] is added to the secret value [a] and the secret value [b'] is added to the secret value [a'] to obtain a secret pair ([a]+[b], [a']+[b']) as ([c], [c']).

Addition of a Secret Pair ([a], [a']) and a Secret Value [b]

If ([c], [c']) is a function value determined by a function that adds a secret pair ([a], [a']) and a secret value [b] together, the secret value [b] is multiplied by the secret value [r] using the multiplication without tampering detection in Non-patent literature 1 to obtain a secret value [b'] and the secret value [b] is added to the secret value [a] and the secret value [b'] is added to the secret value [a'] to obtain a secret pair ([a]+[b], [a']+[b']) as ([c], [c']).

Multiplication of Secret Pairs (([a], [a']) and ([b], [b']))

If ([c], [c']) is a function value determined by a function that multiplies secret pairs ([a], [a']) and ([b], [b']) together, the secret value [a] is multiplied by the secret value [b] and the secret value [a'] is multiplied by [b] using the multiplication without tampering detection in Non-patent literature 1 to obtain a secret pair ([a]·[b], [a']·[b]) as ([c], [c']).

Multiplication of a Secret Pair ([a], [a']) and a Secret Value [b]

If ([c], [c']) is a function value determined by a function that multiples a secret pair ([a], [a']) by a secret value [b], the secret value [a] is multiplied by the secret value [b] and the secret value [a'] is multiplied by [b] using the multiplication without tampering detection in Non-patent literature 1 to obtain a secret pair ([a]·[b], [a']·[b]) as ([c], [c']).

Multiplication of Secret Values [a] and [b]

If ([c], [c']) is a function value that can be determined by a function that multiples secret values [a] and [b] together, the secret value [a] is multiplied by a secret value [r] by using the multiplication without tampering detection in Non-patent literature 1 to obtain a secret value [a'], the secret value [a] is multiplied by the secret value [b] and the secret value [a'] is multiplied by the secret value [b] by using the multiplication without tampering detection in Non-patent literature 1 to obtain a secret pair ([a]·[b], [a'] [b]) as ([c], [c']).

The tampering detectors $13x$, $13y$ and $13z$ cooperate to obtain a secret value [r·C−C'] by the secure function computation method disclosed in Non-patent literature 1 and, if [r·C−C'] is equal to [0], output [C], otherwise, output information indicating that tampering has been detected (S3). The secret value [r·C−C'] can be more efficiently computed after the secret value [r] is reconstructed into r. If the fundamental operations constituting the function f include multiplication of secret pairs (([a], [a']) and ([b], [b'])), [b] and [b'] for each of the fundamental operations are recorded. Prior to the processing at step S3, the tampering detectors $13x$, $13y$ and $13z$ cooperate to obtain a secret value [r·b−b'] for each [b] and [b'] by the secure function computation method disclosed in Non-patent literature 1. If any [r b−b'] is not equal to [0], information indicating that tampering has been detected is output instead of [C] (S3'). The determination as to whether the value of [r·c−c'] is not zero may be made after every multiplication of secret pairs (([a], [a']) and ([b], [b'])).

The efficiency of computation by the secure product-sum combination system and the secure product-sum combination method of the present invention configured as described above will be compared with the efficiency of the computation with tampering detection described in Non-patent literature 1. The amount of computation in Non-patent literature 1 mostly relates to encryption and decryption of communications performed when random number generation and a secure physical channel are not available. The amount of computation relating to the encryption and decryption is proportional to the number of communications. Therefore the number of random number generations can be compared with the number of communications to compare the efficiencies of the computations. The term the "number of rounds" as used in the following description refers to the number of communications that cannot concurrently be performed. For example, the number of rounds increases with the number of situations where a computing apparatus can start an operation only after receiving some information from another computing apparatus.

The present invention has the overhead of random number generation on the whole.

Multiplication of a secret pair by a constant is equivalent in efficiency to multiplication of a secret value by a constant (the number of random number generations, the number of communications and the number of rounds are all 0)

Addition of a constant to a secret pair is equivalent in efficiency to addition of a constant to a secret value (the number of random number generations, the number of communications and the number of rounds are all 0)

Addition of secret pairs is equivalent to addition of secret values (the number of random number generations, the number of communications and the number of rounds are all 0)

For addition of a secret pair and a secret value, the present invention has the overhead of one multiplication without tampering detection For multiplication of secret pairs, the average number of random number generations is 10, the average number of communications is 18, and the number of rounds is 4 in Non-patent literature 1 whereas the average number of random number generations is 2, the average number of communications is 6, and the number of rounds is 2 in the present invention because only two multiplications without tampering detection and one reconstruction for tampering detection are required. The computation of the present invention is five time more efficient in the number of random number generations, three times more efficient in the number of communications, and twice more efficient in the number of rounds than the computation of Non-patent literature 1. Note that the average number of random number generations is the average of the numbers of random number generations performed by the computing apparatuses. For example if one computing apparatus has generated three random numbers and the other two computing apparatus has not generated a random number, the average number of random number generations is one.

For multiplication of a secret pair and a secret value, the average number of random number generations is 10, the average number of communications is 18, and the number of rounds is 4 in Non-patent literature 1. In the present invention, in contrast, the average number of random number generations is 2, the average number of communications is 4 and the number of rounds is 2 because only two multiplications without tampering detection are required. The computation of the present invention is five times more efficient in the number of random number generations, 4.5 times more efficient in the number of communications, and twice more efficient in the number of rounds than the computation in Non-patent literature 1.

For multiplication of secret values, the average number of random number generations is 10, the average number of communication is 18, and the number of rounds is 4 in Non-patent literature 1. In the present invention, in contrast, the average number of random number generations is 3, the average number of communications is 6, and the number of rounds is 2 because only three multiplications without tampering detection are required. The computation of the present invention is about three times more efficient in the number of random number generations, three times more efficient in the number of communications, and twice more efficient in the number of rounds than the computation in Non-patent literature 1.

As seen above, although the efficiency of computations of the present invention other than multiplication is equivalent to or lower than computations in Non-patent literature 1, the efficiency of multiplication, which is the primary bottleneck in secure function computation, is significantly increased. Accordingly, the overall computations of the present invention can be performed more efficiently than the computations in Non-patent literature 1.

Second Embodiment

In a second embodiment, an example will be given where the function f in the first embodiment is exclusive OR (XOR), that is, a function value [C] for inputs $[A_0], \ldots, [A_{n-1}]$ is computed by:

$$[C]=[A_0]\oplus\ldots\oplus[A_i]\oplus\ldots\oplus[A_{n-1}] \quad \text{[Formula 1]}$$

Note that the function that can be efficiently computed is not limited to XOR; any function represented only addition and multiplication can be efficiently computed with the configuration of the first embodiment.

The method in Non-patent literature 1 is used as the base secure computation. First, XOR can be rewritten as:

$$u\oplus v=-2(u-\tfrac{1}{2})(v-\tfrac{1}{2})+\tfrac{1}{2} \quad \text{[Formula 2]}$$

Therefore, the computation can be performed as follows.
1. Generate a secret value [r] of a random number r.
2. For each i (i=0, ..., n−1), compute $[A_i-\tfrac{1}{2}]$.
3. Compute $[c'_0]=[r(A_0-\tfrac{1}{2})]$ using multiplication without tampering detection in Non-patent literature 1. In addition, set $[c_0]=[A_0-\tfrac{1}{2}]$.
4. Repeat (a) and (b) given below for i=1 to i=n−1.
    (a) $[c_i]=[-2(c_{i-1}-\tfrac{1}{2})(A_i-\tfrac{1}{2})+\tfrac{1}{2}]$
    (b) $[c'_i]=[-2(c'_{i-1}-\tfrac{1}{2})(A_i-\tfrac{1}{2})+r/2]$
5. Reconstruct the secret value [r] to obtain r.
6. For $([c_{n-1}], [c'_{n-1}])$, compute $[r \cdot c_{n-1} - c'_{n-1}]$. If the result of the computation is [0], output $[c_{n-1}]$ and end the process; if the result is not [0], output information indicating tampering has been detected and ends the process.

Note that 1. given above corresponds to S1 of the first embodiment, 2. to 4. correspond to S2, and 5. and 6. correspond to S3.

When the same computation is performed by using the method in Non-patent literature 1, n−1 multiplications need to be performed, the average number of random number generations is 10n excluding multiplications by a constant, the average number of communications is 18n, and the number of rounds is 4n. In the present invention, in contrast, the average number of random number generations is 2n, the average number of communications is 4n, and the number of rounds is 2n because only two multiplications without tampering detection are required. The computation of the present invention is five times more efficient in the number of random number generations, 4.5 times more efficient in the number of communications, and twice more efficient in the number of rounds than the computation in Non-patent literature 1.

<Reference: Proof of Detection of Tampering>

Since a secret pair corresponds to the results of addition and multiplication, there is one correct result of computation for each secret pair without tampering. A set of secret pairs that yield a without tampering is written as $P_a$.

Lemma

If a secret pair $([c], [c']) \in P_a$ is represented by $([a+u], [r \cdot a+v])$, tampering can be detected with a probability of $1-1/(p-1)$ or higher by checking whether $[r \cdot c - c']=[0]$, where r is a variable representing a non-zero random number (u and v are tampering values)

Proof

If there is not tampering, there is no need to be able to detect tampering. Therefore, it can be assumed that u≠0 or v≠0 for tampering values u, v.

If u≠0, then $[r \cdot c - c']=[r(a+u)-r \cdot a-v]=[r \cdot u-v]$, the probability that $[r \cdot u-v]=[0]$, that is, the probability that tampering is not detected is $1/(p-1)$ as viewed from the attacker because r is a uniform random number greater than or equal to 1 and less than p and x≠0. In other words, the probability that tampering is detected is $1-1/(p-1)$.

If u=0, it should follow that v≠0. Since $[r \cdot u-v] \ne [0]$, tampering is detected without fail.

A set of $([a+u], [r \cdot a+v])$ as given above is written as $R_a$ $(=\{([a+u], [r \cdot a+v]) | u, v \in Z/pZ\})$. Then, by induction relating to the number k of arithmetic operations (any of 12 arithmetic operations) defined with respect to the function calculators 12x, 12y and 12z of the first embodiment, the following condition is given.

Condition: If there is tampering in a set of ([b], [b']), the tampering is detected with a probability of $1-1/(p-1)$ or higher; otherwise, all of the secret pairs that belong to $P_a$ generated by the arithmetic operations given above belong to $R_a$.

When k=0, ([b], [b']) has not been generated and does not exist, therefore the condition is satisfied.

When k=m+1, the following holds for the m+1-th computation, on the assumption that the condition is satisfied up to k=m.

Multiplication of a Secret Pair by a Constant:
Assuming that $([a+u], [r \cdot a+v]) \in R_a$,
  then $(\alpha[a+u], \alpha[r \cdot a+v])=$
    $([\alpha \cdot a+\alpha \cdot u], [r \cdot \alpha \cdot a+\alpha \cdot v]) \in R_{\alpha a}$ Addition of a Constant to a Secret Pair:
Assuming that $([a+u], [r \cdot a+v]) \in R_a$,
  then $([a+u]+\beta, [r \cdot a+v]+[r \cdot \beta])=$
    $([a+\beta+u], [r(a+\beta)+v]) \in R_{a+\beta}$ Addition of Secret Pairs
Assuming that $([a+u], [r \cdot a+v]) \in R_a$ and $([b+u'], [r \cdot b+v']) \in R_b$,
  then $([a+u]+[a'+u'], [r \cdot a+v]+[r \cdot b+v'])=$
    $([a+b+u+u'], [r(a+b)+v+v']) \in R_{a+b}$ Addition of a Secret Pair and a Secret Value
The same as addition of secret pairs Multiplication of Secret Pairs
Assuming that $([a+u], [r \cdot a+v]) \in R_a$ and $([b+u'], [r \cdot b+v']) \in R_b$ and if v'=0 holds,
  then $([a+u][b+u'], [r \cdot a+v][b+v'])=$
    $([a \cdot b+a \cdot u'+b \cdot u+u \cdot u'], [r \cdot a \cdot b+r \cdot a \cdot v'+b \cdot v+v \cdot v']) \in R_{ab}$ Multiplication of a Secret Pair and a Secret Value
If $([a+u], [r \cdot a+v]) \in R_a$ and [b] is a secret value,
  $([a+u][b], [r \cdot a+v][b])=$
    $([a \cdot b+b \cdot u], [r \cdot a \cdot b+b \cdot v]) \in R_{ab}$ Multiplication of Secret Values
If [a] and [b] are secret values,
  $([a][b], [r \cdot a][b])=([a \cdot b], [r \cdot a \cdot b]) \in R_{ab}$ Here, if there is tampering in any of the first m elements of the set of ([b], [b']), the tampering is detected with a probability of $1-1/(p-1)$ or higher based on the assumption, and the condition is satisfied. If the m+1-th element is multiplication of secret pairs, ([b+u'], [r·b+v']) is added to the set of ([b], [b']). Since this secret pair belongs to $R_b$ on the basis of the assumption, tampering of the secret pair will be detected with a probability of $1-1/(p-1)$ or higher. If there is not tampering of ([b+u'], [r·b+v']), then, from the properties of the computations given above, the secret pair resulting from the computation of the m+1-th element belongs to $R_a$, provided that the pair belongs to $P_a$ because v'=0.

Therefore, by induction, the condition given above holds for any combination of the arithmetic operations defined with respect to the function calculators $12x$, $12y$ and $12z$. That is, if there is tampering of any of the elements in the set of ([b], [b']), the tampering is detected with a probability of $1-1/(p-1)$ or higher; if there is not tampering of any of the elements, tampering of any of secret pairs is detected with a probability of $1-1/(p-1)$ or higher.

In conclusion, performing the process for detecting tampering of elements of a set of ([b], [b']) and the process for detecting tampering of output secret pairs [c] and [c'] can detect tampering, if any, of the output secret pairs can be detected with a probability of $1-1/(p-1)$ or higher.

Third Embodiment

A configuration based on secured function computation including multiplication with tampering detection described in Non-patent literature 1 has been described in the first embodiment. A configuration based on Shamir's scheme will be described in a third embodiment. In the third embodiment, random number generation in the first embodiment is limited to generation of uniform random numbers to eliminate the need for multiplication with tampering detection, thereby enabling the system to be applied to Shamir's scheme. This enables fast and secure arithmetic operations and reduction of the amount of data to half the amount of data in the method described in Non-patent literature 1. Furthermore, a secure product-sum combination system of the third embodiment can include more than three computing apparatuses because the system assumes Shamir's scheme.

A method for concealing data and a method for recovering data by Shamir's scheme will be described. In Shamir's scheme, secret can be recovered by t+1 computing apparatuses which are all or some of available q (q≥3) computing apparatuses. Here, let J denote a set of identification numbers i of selected t+1 computing apparatuses. To conceal data s (0≤s≤p−1) among t+1 computing apparatuses that belong to J, t uniform random numbers $(r_1, \ldots, r_t)$ are generated and $s_i = s + r_1 \cdot i + \ldots + r_t \cdot i^t$ are distributed to each i-th computing apparatus. A secret value [s] (a set of t+1 shares $s_i$) of the data s thus distribute among the t+1 computing apparatuses can be reconstructed from the shares $s_i$ distributed among the computing apparatuses by computing $$s = \sum_{j \in J} \left( s_j \prod_{i \in J, i \neq j} \frac{-i}{j-i} \right) \quad \text{[Formula 3]}$$

Since Shamir's scheme is additive secret sharing, the concealment is commutative. Accordingly, adding the shared values together and then reconstructing the values yields the same result as reconstructing the values and then adding the values together. That is, addition and multiplication by a constant can be performed in a distributed manner without communication. Multiplication is also possible, although communication and generation of random numbers are required. Therefore, the three formulae $[\alpha a + \beta] = \alpha[a] + \beta$ (multiplication by a constant and addition of a constant), $[a+b] = [a] + [b]$ (addition) and $[a \cdot b] = [a] \cdot [b]$ (multiplication)

given earlier can hold. Accordingly, a logic circuit can be configured, so that any operations can be performed. An example of secure function computation according to Shamir's scheme in the case where data a and b are distributed and concealed among three computing apparatuses X, Y and Z (q=3) will be described below. Specifically, shares $a_1$, $a_2$ and $a_3$ of a secret value [a] of data a and shares $b_1$, $b_2$ and $b_3$ of a secret value [b] of data b are distributed as follows: ($a_1$, $b_1$) is distributed to the computing apparatus X, ($a_2$, $b_2$) is distributed to the computing apparatus Y, and ($a_3$, $b_3$) is distributed to the computing apparatus Z. Here, t=1 (secret can be reconstructed by any two of the computing apparatuses).

(1) Secure Function Computation of c=a+b

Each of the computing apparatuses obtains a share $c_j$ of [c] (j=1, ..., q) that is the sum of [a] and [b] by computing $c_j = a_j + b_j$. In this example, q=3. The computing apparatus X computes $c_1 = a_1 + b_1$, the computing apparatus Y computes $c_2 = a_2 + b_2$, and the computing apparatus Z computes $c_3 = a_3 + b_3$.

(2) Secure Function Computation of c=a+α (α is a Known Constant)

Each of the computing apparatuses obtains a share $c_j$ of [c] that is the sum of [a] and a constant α by computing $c_j = a_j + \alpha$. In this example, the computing apparatus X computes $c_1 = a_1 + \alpha$, the computing apparatus Y computes $c_2 = a_2 + \alpha$, and the computing apparatus Z computes $c_3 = a_3 + \alpha$.

(3) Secure Function Computation of c=a·α

Each of the computing apparatus obtains a share $c_j$ of [c] that is the product of [a] and a constant α by computing $c_j = a_j \cdot \alpha$. In this example, the computing apparatus X computes $c_1 = a_1 \cdot \alpha$, the computing apparatus Y computes $c_2 = a_2 \cdot \alpha$, and the computing apparatus Z computes $c_3 = a_3 \cdot \alpha$.

(4) Secure Function Computation of c=a·b (Multiplication without Tampering Detection)

The product [c] of [a] and [b] is obtained as follows.

(i) Each of the computing apparatuses computes $d_i = a_i \cdot b_i$ (i=1, ..., 2t+1). In this example, the computing apparatus X computes $d_0 = a_0 \cdot b_0$, the computing apparatus Y computes $d_1 = a_1 \cdot b_1$, and the computing apparatus Z computes $d_2 = a_2 \cdot b_2$.

(ii) Secret values $[d_1]$, $[d_2]$ and $[d_3]$ of $d_1$, $d_2$ and $d_3$ are generated by the data concealment method according to Shamir's scheme described above. In this example, the shares of $[d_1]$ are denoted by $d_{1,0}$, $d_{1,1}$ and $d_{1,2}$, the shares of $[d_2]$ are denoted by $d_{2,0}$, $d_{2,1}$ and $d_{2,2}$, and the shares of $[d_3]$ are denoted by $d_{3,0}$, $d_{3,1}$ and $d_{3,2}$. The computing apparatus X records $d_{1,0}$, $d_{2,0}$ and $d_{3,0}$, the computing apparatus Y records $d_{1,1}$, $d_{2,1}$ and $d_{3,1}$, and the computing apparatus Z records $d_{1,2}$, $d_{2,2}$ and $d_{3,2}$, thereby concealing $d_1$, $d_2$ and $d_3$.

(iii) Each of the computing apparatuses obtains a share $c_j$ of the product [c] of [a] and [b] by computing the formula given below. In this example, the computing apparatuses X, Y and Z compute $c_1$, $c_2$ and $c_3$, respectively.

$$c_j = \sum_{i=1}^{2t+1}\left(d_{i,j} \prod_{h=1, h\neq i}^{2t+1} \frac{-h}{i-h}\right)$$ [Formula 4]

Figure 4:
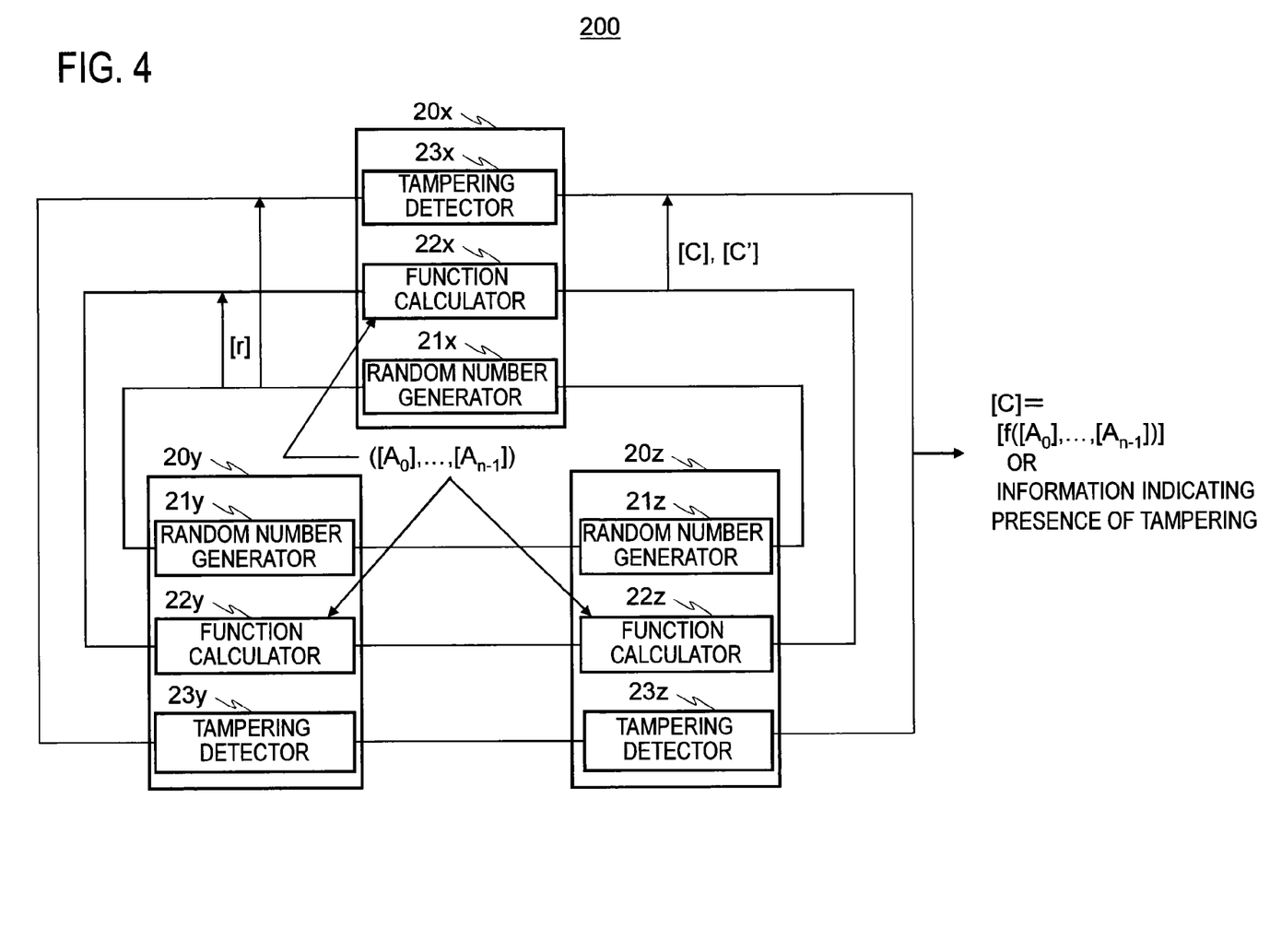
FIG. 4 is a diagram illustrating an exemplary configuration of a secure product-sum combination system 200.
Figure 5:
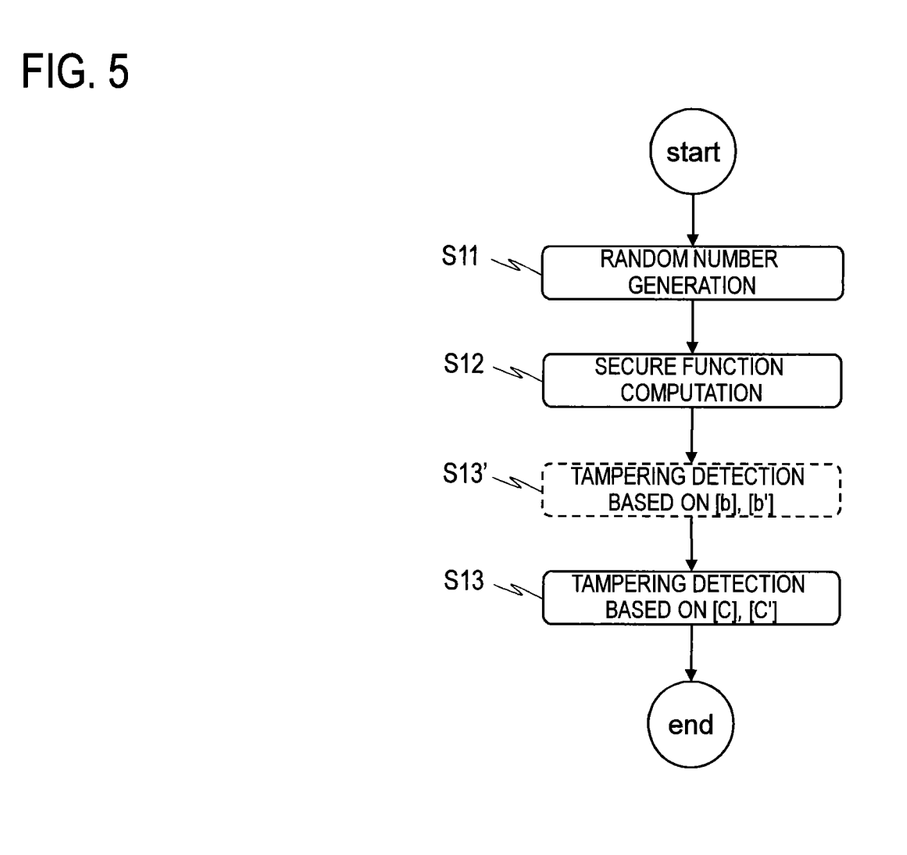
FIG. 5 is a diagram illustrating an exemplary process flow in a secure product-sum combination system 200.

FIG. 4 illustrates an exemplary configuration of a secure product-sum combination system 200 based on Shamir's scheme and FIG. 5 illustrates an exemplary process flow in the secure product-sum combination system 200. The secure product-sum combination system 200 includes q computing apparatuses. Here, an example where three computing apparatuses (computing apparatuses 20x, 20y and 20z) are used, as in the first embodiment, will be described.

The three computing apparatuses 20x, 20y and 20z of the secure product-sum combination system 200 perform secure function computation on secret values $[A_0], \ldots, [A_{n-1}]$ concealed by secret sharing of n arbitrary values $A_0, \ldots, A_{n-1}$ greater than or equal to 0 and less than p by using a function f including addition and/or multiplication in cooperation with one another to compute a concealed function value $[C]=[f([A_0], \ldots, [A_{n-1}])]$.

The computing apparatus 20x includes a random number generator 21x, a function calculator 22x and a tampering detector 23x; computing apparatus 20y includes a random number generator 21y, a function calculator 22y, and a tampering detector 23y; and computing apparatus 20z includes a random number generator 21z, a function calculator 22z and a tampering detector 23z.

The random number generators 21x, 21y and 21z generate a secret value [r] of a uniform random number r in corporation with one another (S11). Specifically, the secret value [r] is generated as follows, for example (see FIG. 6). First, the random number generator 21x generates a uniform random umber $r_X$, the random number generator 21y generates a uniform random number $r_Y$, and the random number generator 21z generates a uniform random number $r_Z$ (S11-1). Then, the data concealment method according to Shamir's scheme described above is used to generate secret values $[r_X]$, $[r_Y]$ and $[r_Z]$ of $r_X$, $r_Y$ and $r_Z$. Specifically, shares of $[r_X]$ are denoted by $r_{X,0}$, $r_{X,1}$ and $r_{X,2}$, shares of $[r_Y]$ are denoted by $r_{Y,0}$, $r_{Y,1}$ and $r_{Y,2}$, and shares of $[r_Z]$ are denoted by $r_{Z,0}$, $r_{Z,1}$ and $r_{Z,2}$. The random number generator 21x records $r_{X,0}$, $r_{Y,0}$ and $r_{Z,0}$, the random number generator 21y records $r_{X,1}$, $r_{Y,1}$ and $r_{Z,1}$, and the random number generator 21z records $r_{X,2}$, $r_{Y,2}$ and $r_{Z,2}$ (S11-2). By distributing and recording the shares in this way, the data is concealed. Then the random number generator 21x computes $r_0=r_{X,0}+r_{Y,0}+r_{Z,0}$, the random number generator 21y computes $r_1=r_{X,1}+r_{Y,1}+r_{Z,1}$, and the random number generator 21z computes $r_2=r_{X,2}+r_{Y,2}+r_{Z,2}$, thereby obtaining the shares $r_0$, $r_1$ and $r_2$ of the secret value [r] (S11-3).

The function calculators 22x, 22y and 22z cooperate to compute a concealed function values $[C]=[g[A_0], \ldots, [A_{n-1}])]$ and $[C']=[r\cdot f([A_0], \ldots, [A_{n-1}])]$ by using a function f including addition and/or multiplication on input secret values $[A_0], \ldots, [A_{n-1}]$ (S12). [C] and [C'] can be computed in parallel for higher efficiency of computation. To compute in parallel, the addition/multiplication of combinations of a constant, secret values, and secret pairs, which are pairs of secret values, need to be defined. The operations to be defined correspond to the fundamental operations described in the first embodiment. That is, as in the first embodiment, the function f in the third embodiment is one fundamental operation or a combination of multiple fundamental operations.

The additions and multiplications of the secret function computation method according to Shamir's scheme described above can be applied to addition of secret values, addition of a constant to a secret value and multiplication of a secret value by a constant among the additions and multiplications to be defined. Here, the other operations will be described. It is assumed in the description that [a] and [b] are secret values concealed by encryption or secret sharing of arbitrary values a and b greater than or equal to 0 and less than p, and [a']=r·[a] and [b']=r·[b]. Note that if the function f consists of multiple fundamental operations, [c] and [c'] are computed for each of the fundamental operations. For example, in the case of addition of $[A_0]$, $[A_1]$ and $[A_2]$, addition of $[A_0]$ and $[A_1]$ is performed as the first fundamental operation. In the first fundamental operation, $[A_0]$ is [a] and $[A_1]$ is [b]. As the results of the first fundamental operation, [c] and [c'] are obtained. In the second fundamental operation, the results of the first computation, [c] and [c'], are set as [a] and [a'] and $[A_2]$ is set as [b] to perform addition to obtain the results of the second fundamental operation, [c] and [c']. Since the function f in this example is a combination of two additions, the results [c] and [c'] of the second fundamental operation are function values [C] and [C'] of the function f.

Multiplication of a Secret Pair ([a], [a'])

If ([c], [c']) is a function value determined by a function that multiplies a secret pair ([a], [a']) by a constant, each of the secret pair ([a], [a']) is multiplied by an arbitrary constant α greater than or equal to 0 and less than p to obtain a secret pair (α·[a], α·[a']) as ([c], [c']).

Addition of a Constant to a Secret Pair ([a], [a'])

If ([c], [c']) is a function value determined by a function that adds a constant to a secret pair ([a], [a']), a secret value [r] is multiplied by an arbitrary constant β greater than or equal to 0 and less than p to obtain a secret value [r·β] the constant β is added to the secret value [a], and the secret value [r·β] is added to the secret value [a'] to obtain a secret pair ([a]+β, [a']+[r·β]) as ([c], [c']).

Addition of Secret Pairs (([a], [a']) and ([b], [b']))

If ([c], [c']) is a function value determined by a function that adds secret pairs ([a], [a']) and ([b], [b']) together, the secret value [b] is added to the secret value [a] and the secret value [b'] is added to the secret value [a'] to obtain a secret pair ([a]+[b], [a']+[b']) as ([c], [c']).

Addition of a Secret Pair ([a], [a']) and a Secret Value [b]

If ([c], [c']) is a function value determined by a function that adds a secret pair ([a], [a']) and a secret value [b] together, the secret value [b] is multiplied by the secret value [r] using the multiplication without tampering detection of the secure function computation method according to Shamir's scheme to obtain a secret value [b'], the secret value [b] is added to the secret value [a] and the secret value [b'] is added to the secret value [a'] to obtain a secret pair ([a]+[b], [a']+[b']) as ([c], [c']).

Multiplication of Secret Pairs (([a], [a']) and ([b], [b']))

If ([c], [c']) is a function value determined by a function that multiplies secret pairs ([a], [a']) and ([b], [b']) together, the secret value [a] is multiplied by the secret value [b] and the secret value [a'] is multiplied by the secret value [b] using the multiplication without tampering detection of the secure function computation method according to Shamir's scheme to obtain a secret pair ([a]·[b], [a']·[b]) as ([c], [c']).

Multiplication of a secret pair ([a], [a']) and a secret value [b]

If ([c], [c']) is a function value determined by a function that multiples a secret pair ([a], [a']) by a secret value [b], the secret value [a] is multiplied by the secret value [b] and the secret value [a'] is multiplied by [b] using the multiplication without tampering detection of the secure function computation method according to Shamir's scheme to obtain a secret pair ([a] ·[b], [a']·[b]) as ([c], [c']).

Multiplication of Secret Values [a] and [b]

If ([c], [c']) is a function value that can be determined by a function that multiples secret values [a] and [b] together, the secret value [a] is multiplied by a secret value [r] using the multiplication without tampering detection of the secure function computation method according to Shamir's scheme to obtain a secret value [a'], the secret value [a] is multiplied by the secret value [b] and the secret value [a'] is multiplied by the secret value [b] using the multiplication without tampering detection of the secure function computation method according to Shamir's scheme to obtain a secret pair ([a]·[b], [a']·[b]) as ([c], [c']).

The tampering detectors 23x, 23y and 23z cooperate to obtain a secret value [r·C−C'] by using the secure function computation method according to Shamir's scheme and, if [r·C−C'] is equal to [0], output [C], otherwise, output information indicating that tampering is detected (S13). The secret value [r·C−C'] can be more efficiently computed after the secret value [r] is reconstructed into r. If the fundamental operations constituting the function f includes multiplication of secret pairs (([a], [a']) and ([b], [b'])), [b] and [b'] for each of the fundamental operations are recorded. Prior to the operation at step S13, the tampering detectors 23x, 23y and 23z cooperate to obtain a secret value [r b−b'] for each [b] and [b'] by the secure function computation method according to Shamir's scheme. If any [r·b−b'] is not equal to [0], information indicating that tampering has been detected is output instead of [C] (S13'). The determination as to whether the value of [r·c−c'] is not zero may be made after every multiplication of secret pairs (([a], [a']) and ([b], [b'])).

The processes in any of the secure product-sum combination systems and the secure product-sum computing methods described above may be performed not only in time sequence as is written but also in parallel with one another or individually, depending on the throughput of the apparatuses that perform the processes or requirements. Furthermore, the functions of the components of any of the secure product-sum combination systems may be integrated together or separated as required. Other modification can be made as appropriate without departing from the spirit of the present invention. When any of the secure product-sum combination systems and computing apparatuses of the embodiments of the present invention is implemented by a computer, the processes of the functions of the apparatus and its components are described by a program. The program may be stored in a hard disk device, for example, and when the program is executed, the program and data required are loaded into a RAM (Random Access Memory). The loaded program is executed by a CPU to implement the processes on the computer.

What is claimed is:

1. A secure product-sum combination system comprising:
three or more computing apparatuses configured to cooperate to perform a secure function computation on secret values $[A_0], \ldots, [A_{n-1}]$ concealed by encryption or secret sharing of n arbitrary values $A_0, \ldots, A_{n-1}$ greater than or equal to 0 and less than p by using a function f including addition and/or multiplication to compute a concealed function value [C] as $[C]=[f([A_0], \ldots, [A_{n-1}])]$, where p is a prime and [ ] is a symbol representing that a value is concealed by encryption or secret sharing, wherein $[\alpha a+\beta]=\alpha[a]+\beta$, $[a+b]=[a]+[b]$ and $[a \cdot b]=[a] \cdot [b]$ hold, where a, b, α and β are arbitrary values greater than or equal to 0 and less than p; and each of the three or more computing apparatuses comprises at least one processor configured to:
cooperate with at least other two computing apparatuses to generate a secret value [r] of a random number r greater than or equal to 0 and less than p;
cooperate with the at least other two computing apparatuses to compute concealed function values $[C]=[f([A_0], \ldots, [A_{n-1}])]$ and $[C']=[r \cdot f([A_0], \ldots, [A_{n-1}])]$ for the secret values $[A_0], \ldots, [A_{n-1}]$ by using the function f including addition and/or multiplication; and
cooperate with the at least other two computing apparatuses to compute a secret value [r·C−C'] and if [r·C−C'] is [0], outputting [C], otherwise outputting information indicating that tampering has been detected.

2. The secure product-sum combination system according to claim 1, wherein $[a']=r \cdot [a]$ and $[b']=r \cdot [b]$, and when ([c], [c']) is a function value determined by a function that multiplies a secret pair ([a], [a']) by a constant α, the at least one processor of each of the three or more computing apparatuses being configured to multiply each of the secret pair ([a], [a']) by the constant α to obtain a secret pair (α·[a], α ·[a']) as ([c], [c']);

when ([c], [c']) is a function value determined by a function that adds a constant β to a secret pair ([a], [a']), the at least one processor of each of the three or more computing apparatuses being configured to multiply the secret value [r] by the constant β to obtain a secret value [r·β], add the constant β to the secret value [a] and add the secret value [r·β] to the secret value [a'] to obtain a secret pair ([a]+β, [a']+[r·β]) as ([c], [c']);

when ([c], [c']) is a function value determined by a function that adds secret pairs (([a], [a']) and ([b], [b'])) together, the at least one processor of each of the three or more computing apparatuses being configured to add the secret value [b] to the secret value [a] and add the secret value [b'] to the secret value [a'] to obtain a secret pair ([a]+[b], [a']+[b']) as ([c], [c']);

when ([c], [c']) is a function value determined by a function that adds a secret pair ([a], [a']) and a secret value [b] together, the function calculator multiplies the at least one processor of each of the three or more computing apparatuses being configured to multiply the secret value [b] by the secret value [r] to obtain a secret value [b'], add the secret value [b] to the secret value [a] and add the secret value [b'] to the secret value [a'] to obtain ([a]+[b], [a']+[b']) as ([c], [c']);

when ([c], [c']) is a function value determined by a function that multiples secret pairs (([a], [a']) and ([b], [b'])) together, the at least one processor of each of the three or more computing apparatuses being configured to multiply the secret value [a] by the secret value [b] and multiply the secret value [a'] by the secret value [b] to obtain a secret pair ([a]·[b], [a']·[b]) as ([c], [c']);

when ([c], [c']) is a function value determined by a function that multiplies a secret pair ([a], [a']) and a secret value [b] together, the at least one processor of each of the three or more computing apparatuses being configured to multiply the secret value [a] by the secret value [b] and multiply the secret value [a'] by the secret value [b] to obtain a secret pair ([a]·[b], [a']·[b]) as ([c], [c']);

when ([c], [c']) is a function value determined by a function that multiplies secret values [a] and [b] together, the at least one processor of each of the three or more computing apparatuses being configured to multiply the secret value [a] by the secret value [r] to obtain a secret value [a'], multiply the secret value [a] by the secret value [b] and multiply the secret value [a'] by the secret value [b] to obtain a secret pair ([a]·[b], [a']·[b]) as ([c], [c']); and when ([c], [c']) is a function value determined by a function that multiplies secret pairs (([a], [a']) and ([b], [b'])) together, the at least one processor of each of the three or more computing apparatuses being configured to cooperate with other two computing apparatuses to obtain a secret value [r·b−b'] and, if the secret value [r·b−b'] is not 0, output information indicating that tampering has been detected without outputting [C].

3. The secure product-sum combination system according to claim 1, wherein there are three of the computing apparatuses cooperating to perform a secret function computation, the three computing apparatuses being a computing apparatus X, a computing apparatus Y and a computing apparatus Z;

the at least one processor of the computing apparatus X is configured to generate a random number $r_Z$ greater than or equal to 1 and less than p and share the random number $r_Z$ with the computing apparatus Y;

the at least one processor of the computing apparatus Y is configured to generate a random number $r_X$ greater than or equal to 1 and less than p and share the random number $r_X$ with the computing apparatus Z;

the at least one processor of the computing apparatus Z is configured to generate a random number $r_Y$ greater than or equal to 1 and less than p and share the random number $r_X$ with the computing apparatus X; and the at least one processor of the three computing apparatuses is configured to cooperate to generate secret values $[r_X]$, $[r_Y]$ and $[r_Z]$ and multiply the secret values $[r_X]$, $[r_Y]$ and $[r_Z]$ together to generate a secret value $[r]=[r_X \cdot r_Y \cdot r_Z]$.

4. The secure product-sum combination system according to claim 1, wherein there are three of the computing apparatuses cooperating to perform a secret function computation, the three computing apparatuses being a computing apparatus X, a computing apparatus Y and a computing apparatus Z;

the at least one processor of the computing apparatus X is configured to generate a random number $r_Z$ greater than or equal to 0 and less than p and share the random number $r_Z$ with the computing apparatus Y;

the at least one processor of the computing apparatus Y is configured to generate a random number $r_X$ greater than or equal to 0 and less than p and the random number $r_X$ with the computing apparatus Z;

the at least one processor of the computing apparatus Z is configured to generate a random number $r_Y$ greater than or equal to 0 and less than p and share the random number $r_X$ with the computing apparatus X; and the at least one processor of the three computing apparatuses is configured to cooperate to generate secret values $[r_X]$, $[r_Y]$ and $[r_Z]$ and multiply the secret values $[r_X]$, $[r_Y]$ and $[r_Z]$ together to generate a secret value $[r]=[r_X+r_Y+r_Z]$.

5. The secure product-sum combination system according to claim 2, wherein there are three of the computing apparatuses cooperating to perform a secret function computation, the three computing apparatuses being a computing apparatus X, a computing apparatus Y and a computing apparatus Z;

the at least one processor of the computing apparatus X is configured to generate a random number $r_Z$ greater than or equal to 1 and less than p and share the random number $r_Z$ with the computing apparatus Y;

the at least one processor of the computing apparatus Y is configured to generate a random number $r_X$ greater than or equal to 1 and less than p and share the random number $r_X$ with the computing apparatus Z;

the at least one processor of the computing apparatus Z is configured to generate a random number $r_Y$ greater than or equal to 1 and less than p and share the random number $r_X$ with the computing apparatus X; and the at least one processor of the three computing apparatuses is configured to cooperate to generate secret values $[r_X]$, $[r_Y]$ and $[r_Z]$ and multiply the secret values $[r_X]$, $[r_Y]$ and $[r_Z]$ together to generate a secret value $[r]=[r_X \cdot r_Y \cdot r_Z]$.

6. The secure product-sum combination system according to claim 2, wherein there are three of the computing apparatuses cooperating to perform a secret function computation, the three computing apparatuses being a computing apparatus X, a computing apparatus Y and a computing apparatus Z;

the at least one processor of the computing apparatus X is configured to generate a random number $r_Z$ greater than or equal to 0 and less than p and share the random number $r_Z$ with the computing apparatus Y;

the at least one processor of the computing apparatus Y is configured to generate a random number $r_X$ greater than or equal to 0 and less than p and share the random number $r_X$ with the computing apparatus Z;

the at least one processor of the computing apparatus Z is configured to generate a random number $r_Y$ greater than or equal to 0 and less than p and share the random number $r_X$ with the computing apparatus X; and the at least one processor of the three computing apparatuses is configured to cooperate to generate secret values $[r_X]$, $[r_Y]$ and $[r_Z]$ and multiply the secret values $[r_X]$, $[r_Y]$ and $[r_Z]$ together to generate a secret value $[r]=[r_X+r_Y+r_Z]$.

7. A computing apparatus constituting a secure product-sum combination system comprising:

three or more computing apparatuses configured to cooperate to perform a secure function computation on secret values $[A_0], \ldots, [A_{n-1}]$ concealed by encryption or secret sharing of n arbitrary values $A_0, \ldots, A_{n-1}$ greater than or equal to 0 and less than p by using a function f including addition and/or multiplication to compute a concealed function value [C] as $[C]=[f([A_0], \ldots, [A_{n-1}])]$, where p is a prime and [ ] is a symbol representing that a value is concealed by encryption or secret sharing, wherein in the secure product-sum combination system, $$[\alpha a + \beta] = \alpha[a] + \beta,$$

$$[a+b]=[a]+[b] \text{ and}$$

$$[a \cdot b]=[a] \cdot [b]$$

hold, where a, b, α and β are arbitrary values greater than or equal to 0 and less than p; and each of the three or more computing apparatuses comprises at least one processor configured to:

cooperate with at least other two computing apparatuses to generate a secret value [r] of a random number r greater than or equal to 0 and less than p;

cooperate with the at least other two computing apparatuses to compute concealed function values $[C]=[f([A_0], \ldots, [A_{n-1}])]$ and $[C']=[r \cdot f([A_0], \ldots, [A_{n-1}])]$ for the secret values $[A_0], \ldots, [A_{n-1}]$ by using the function f including addition and/or multiplication; and cooperate with the at least other two computing apparatuses to compute a secret value [r·C−C'] and if [r·C−C'] is [0], outputting [C], otherwise outputting information indicating that tampering has been detected.

8. A secure product-sum combination method for three or more computing apparatuses to cooperate to perform a secure function computation on secret values $[A_0], \ldots, [A_{n-1}]$ concealed by encryption or secret sharing of n arbitrary values $A_0, \ldots, A_{n-1}$ greater than or equal to 0 and less than p by using a function f including addition and/or multiplication to compute a concealed function value [C] as $[C]=[f([A_0], \ldots, [A_{n-1}])]$, where p is a prime and [ ] is a symbol representing that a value is concealed by encryption or secret, wherein $$[\alpha a + \beta] = \alpha[a] + \beta,$$

$$[a+b]=[a]+[b] \text{ and}$$

$$[a \cdot b] = [a] \cdot [b]$$

hold, where a, b, α and β are arbitrary values greater than or equal to 0 and less than p, and
the secure product-sum combination method comprises:
a random number generating step of generating a secret value [r] of a random number r greater than or equal to 0 and less than p by cooperation among the three or more computing apparatuses;
a function computing step of computing concealed function values $[C]=[f([A_0], \ldots, [A_{n-1}])]$ and $[C']=[r \cdot f([A_0], \ldots, [A_{n-1}])]$ for the secret values $[A_0], \ldots, [A_{n-1}])]$, by using the function f including addition and/or multiplication by cooperation among the three or more computing apparatuses; and
a tampering detecting step of computing a secret value [r·C−C'] by cooperation among the three or more computing apparatuses, and if [r·C−C'] is [0], outputting [C], otherwise, outputting information indicating that tampering has been detected.

9. The secure product-sum combination method according to claim 8,
wherein [a']=r·[a] and [b']=r·[b], and
when ([c], [c']) is a function value determined by a function that multiplies a secret pair ([a], [a']) by a constant α, the function computing step multiplies each of the secret pair ([a], [a']) by the constant α to obtain a secret pair (α·[a], α·[a']) as ([c], [c']);
when ([c], [c']) is a function value determined by a function that adds a constant β to a secret pair ([a], [a']), the function computing step multiplies the secret value [r] by the constant β to obtain a secret value [r·β], adds the constant β to the secret value [a] and adds the secret value [r·β] to the secret value [a'] to obtain a secret pair ([a]+β, [a']+[r·β]) as ([c], [c']);
when ([c], [c']) is a function value determined by a function that adds secret pairs (([a], [a']) and ([b], [b'])) together, the function computing step adds the secret value [b] to the secret value [a] and adds the secret value [b'] to the secret value [a'] to obtain a secret pair ([a]+[b], [a']+[b']) as ([c], [c']);
when ([c], [c']) is a function value determined by a function that adds a secret pair ([a], [a']) and a secret value [b] together, the function computing step multiplies the secret value [b] by the secret value [r] to obtain a secret value [b'], adds the secret value [b] to the secret value [a] and adds the secret value [b'] to the secret value [a'] to obtain ([a]+[b], [a']+[b']) as ([c], [c']);
when ([c], [c']) is a function value determined by a function that multiples secret pairs (([a], [a']) and ([b], [b'])) together, the function computing step multiplies the secret value [a] by the secret value [b] and multiplies the secret value [a'] by the secret value [b] to obtain a secret pair ([a]·[b], [a']·[b]) as ([c], [c']);
when ([c], [c']) is a function value determined by a function that multiplies a secret pair ([a], [a']) and a secret value [b] together, the function computing step multiplies the secret value [a] by the secret value [b] and multiplies the secret value [a'] by the secret value [b] to obtain a secret pair ([a]·[b], [a']·[b]) as ([c], [c']);
when ([c], [c']) is a function value determined by a function that multiplies secret values [a] and [b] together, the function computing step multiplies the secret value [a] by the secret value [r] to obtain a secret value [a'], multiplies the secret value [a] by the secret value [b] and multiplies the secret value [a'] by the secret value [b] to obtain a secret pair ([a]·[b], [a']·[b]) as ([c], [c']); and
when ([c], [c']) is a function value determined by a function that multiplies secret pairs (([a], [a']) and ([b], [b'])) together, the tampering detecting step further cooperates with the tampering detectors of other two computing apparatuses to obtain a secret value [r·b−b'] and, if the secret value [r·b−b'] is not 0, outputs information indicating that tampering has been detected without outputting [C].

10. The secure product-sum combination method according to claim 8, wherein
there are three of the computing apparatuses cooperating to perform a secret function computation, the three computing apparatuses being a computing apparatus X, a computing apparatus Y and a computing apparatus Z; and
the random number generating step comprises:
a fragment sharing sub-step of the computing apparatus X generating a random number $r_Z$ greater than or equal to 1 and less than p and sharing the random number $r_Z$ with the computing apparatus Y, the computing apparatus Y generating a random number $r_X$ greater than or equal to 1 and less than p and sharing the random number $r_X$ with the computing apparatus Z, and the computing apparatus Z generating a random number $r_Y$ greater than or equal to 1 and less than p and sharing the random number $r_X$ with the computing apparatus X;
a fragment concealing sub-step of generating secret values $[r_X], [r_Y]$ and $[r_Z]$ by cooperation among the three computing apparatuses; and
a fragment combining sub-step of multiplying the secret values $[r_X], [r_Y]$ and $[r_Z]$ together to generate a secret value $[r]=[r_X \cdot r_Y \cdot r_Z]$ by cooperation among the three computing apparatuses.

11. The secure product-sum combination method according to claim 8,
wherein there are three of the computing apparatuses cooperating to perform a secret function computation, the three computing apparatuses being a computing apparatus X, a computing apparatus Y and a computing apparatus Z; and
the random number generating step comprises:
a fragment sharing sub-step of the computing apparatus X generating a random number $r_Z$ greater than or equal to 0 and less than p and sharing the random number $r_Z$ with the computing apparatus Y, the computing apparatus Y generating a random number $r_X$ greater than or equal to 0 and less than p and sharing the random number $r_X$ with the computing apparatus Z, and the computing apparatus Z generating a random number $r_Y$ greater than or equal to 0 and less than p and sharing the random number $r_Y$ with the computing apparatus X;
a fragment concealing sub-step of generating secret values $[r_X]$, $[r_Y]$ and $[r_Z]$ by cooperation among the three computing apparatuses; and
a fragment combining sub-step of multiplying the secret values $[r_X]$, $[r_Y]$ and $[r_Z]$ together to generate a secret value $[r]=[r_X+r_Y+r_Z]$ by cooperation among the three computing apparatuses.

12. The secure product-sum combination method according to claim 9, wherein
there are three of the computing apparatuses cooperating to perform a secret function computation, the three computing apparatuses being a computing apparatus X, a computing apparatus Y and a computing apparatus Z; and
the random number generating step comprises:
a fragment sharing sub-step of the computing apparatus X generating a random number $r_Z$ greater than or equal to 1 and less than p and sharing the random number $r_Z$ with the computing apparatus Y, the computing apparatus Y generating a random number $r_X$ greater than or equal to 1 and less than p and sharing the random number $r_X$ with the computing apparatus Z, and the computing apparatus Z generating a random number $r_Y$ greater than or equal to 1 and less than p and sharing the random number $r_Y$ with the computing apparatus X;
a fragment concealing sub-step of generating secret values $[r_X]$, $[r_Y]$ and $[r_Z]$ by cooperation among the three computing apparatuses; and
a fragment combining sub-step of multiplying the secret values $[r_X]$, $[r_Y]$ and $[r_Z]$ together to generate a secret value $[r]=[r_X \cdot r_Y \cdot r_Z]$ by cooperation among the three computing apparatuses.

13. The secure product-sum combination method according to claim 9, wherein
there are three of the computing apparatuses cooperating to perform a secret function computation, the three computing apparatuses being a computing apparatus X, a computing apparatus Y and a computing apparatus Z; and
the random number generating step comprises:
a fragment sharing sub-step of the computing apparatus X generating a random number $r_Z$ greater than or equal to 0 and less than p and sharing the random number $r_Z$ with the computing apparatus Y, the computing apparatus Y generating a random number $r_X$ greater than or equal to 0 and less than p and sharing the random number $r_X$ with the computing apparatus Z, and the computing apparatus Z generating a random number $r_Y$ greater than or equal to 0 and less than p and sharing the random number $r_Y$ with the computing apparatus X;
a fragment concealing sub-step of generating secret values $[r_X]$, $[r_Y]$ and $[r_Z]$ by cooperation among the three computing apparatuses; and
a fragment combining sub-step of multiplying the secret values $[r_Y]$, $[r_Y]$ and $[r_Z]$ together to generate a secret value $[r]=[r_X+r_Y+r_Z]$ by cooperation among the three computing apparatuses.

14. A non-transitory computer-readable storage medium including computer executable instructions that when executed cause a computer to execute a secure product-sum combination method for three or more computing apparatuses to cooperate to perform a secure function computation on secret values $[A_0], \ldots, [A_{n-1}]$ concealed by encryption or secret sharing of n arbitrary values $A_0, \ldots, A_{n-1}$ greater than or equal to 0 and less than p by using a function f including addition and/or multiplication to compute a concealed function value $[C]$ as $[C]=[f([A_0], \ldots, [A_{n-1}])]$, where p is a prime and [ ] is a symbol representing that a value is concealed by encryption or secret, wherein $[\alpha a+\beta]=\alpha[a]+\beta$, $[a+b]=[a]+[b]$ and $[a \cdot b]=[a] \cdot [b]$ hold, where a, b, $\alpha$ and $\beta$ are arbitrary values greater than or equal to 0 and less than p, the secure product-sum combination method comprising:
a random number generating step of generating a secret value $[r]$ of a random number r greater than or equal to 0 and less than p by cooperation among the three or more computing apparatuses;
a function computing step of computing concealed function values $[C]=[f([A_0], \ldots, [A_{n-1}])]$ and $[C']=[r \cdot f([A_0], \ldots, [A_{n-1}])]$ for the secret values $[A_0], \ldots, [A_{n-1}]$ by using the function f including addition and/or multiplication by cooperation among the three or more computing apparatuses; and
a tampering detecting step of computing a secret value $[r \cdot C - C']$ by cooperation among the three or more computing apparatuses, and if $[r \cdot C - C']$ is $[0]$, outputting $[C]$, otherwise, outputting information indicating that tampering has been detected.

* * * * *